United States Patent
Allert et al.

(10) Patent No.: US 7,967,537 B2
(45) Date of Patent: Jun. 28, 2011

(54) ADJUSTMENT DEVICE FOR THE ALIGNMENT OF SUPPORTING PARTS ON STRUCTURES HAVING INHERENT DIMENSIONAL TOLERANCES

(75) Inventors: Torben Allert, Bremen (DE); Jens Krüger, Schönebeck (DE)

(73) Assignee: Airbus Deutschland GmbH, Hamburg (DE)

( * ) Notice: Subject to any disclaimer, the term of this patent is extended or adjusted under 35 U.S.C. 154(b) by 208 days.

(21) Appl. No.: 11/906,012

(22) Filed: Sep. 28, 2007

(65) Prior Publication Data

US 2008/0083849 A1 Apr. 10, 2008

(30) Foreign Application Priority Data

Oct. 4, 2006 (DE) .......................... 10 2006 047 238

(51) Int. Cl.
*B60P 7/08* (2006.01)
(52) U.S. Cl. ........................................... 410/80; 410/77
(58) Field of Classification Search .................... 410/46, 410/66, 67, 77, 80, 94, 95; 244/118.1, 137.1
See application file for complete search history.

(56) References Cited

U.S. PATENT DOCUMENTS

| | | | |
|---|---|---|---|
| 2,887,070 A * | 5/1959 | Terlecky et al. | 410/94 |
| 3,092,043 A | 6/1963 | Tobin | |
| 3,125,035 A * | 3/1964 | Loomis | 410/80 |
| 3,878,806 A | 4/1975 | Garcia | |
| 3,966,075 A * | 6/1976 | Schultz | 220/1.5 |
| 4,753,615 A | 6/1988 | Weidler et al. | |
| 5,013,197 A | 5/1991 | Allaert et al. | |
| 5,230,485 A | 7/1993 | Vogg et al. | |
| 5,234,297 A | 8/1993 | Wieck et al. | |
| 5,308,202 A * | 5/1994 | Tatina | 410/94 |
| 5,597,084 A | 1/1997 | Parasin | |
| 5,846,042 A | 12/1998 | Iannuzzi | |
| 6,000,888 A * | 12/1999 | Hartman | 408/239 R |
| 6,530,674 B2 | 3/2003 | Grierson et al. | |
| 6,578,902 B2 | 6/2003 | Sill | |
| 7,086,815 B2 | 8/2006 | Bruns | |
| 7,100,299 B2 | 9/2006 | Jensen et al. | |
| 7,201,550 B2 | 4/2007 | Borrmann et al. | |
| 7,214,015 B2 | 5/2007 | Bruns | |
| 7,406,777 B2 | 8/2008 | Grover et al. | |
| 7,469,478 B2 | 12/2008 | Mitterreiter | |
| 2002/0180238 A1 | 12/2002 | Sill | |
| 2004/0265087 A1 | 12/2004 | Bruns | |
| 2008/0083849 A1 * | 4/2008 | Allert et al. | 244/118.2 |
| 2008/0089756 A1 | 4/2008 | Allert et al. | |
| 2009/0229105 A1 | 9/2009 | Schubetzer | |

OTHER PUBLICATIONS

U.S. Appl. No. 11/906,019, filed Sep. 28, 2007.
U.S. Appl. No. 11/906,018, filed Sep. 28, 2007.

* cited by examiner

*Primary Examiner* — Stephen Gordon
(74) *Attorney, Agent, or Firm* — Collard & Roe, P.C.

(57) ABSTRACT

An adjustment device aligns supporting parts that pivotally accommodate the guide rails of a freight loading system on structures having inherent dimensional tolerances. The structures can in particular be in an aircraft fuselage. Each supporting part is designed as a bearing insert that can be inserted in a bearing eye of a bearing block such that it cannot rotate. Each bearing insert has fitting surface sections separated from one another by planes of symmetry. Each bearing insert has at least one asymmetrically arranged axis accommodation.

8 Claims, 2 Drawing Sheets

ADJUSTMENT DEVICE FOR THE ALIGNMENT OF SUPPORTING PARTS ON STRUCTURES HAVING INHERENT DIMENSIONAL TOLERANCES

CROSS REFERENCE TO RELATED APPLICATIONS

Applicants claim priority under 35 U.S.C. §119 of German Application No. 10 2006 047 238.1 filed Oct. 4, 2006.

BACKGROUND OF THE INVENTION

1. Field of the Invention

The invention relates to an adjustment device for aligning the supporting parts which pivotally accommodate the guide rails of a freight loading system on structures having inherent dimensional tolerances, in particular in an aircraft fuselage.

2. The Prior Art

Containers or pallets are guided and secured in predetermined tracks with guide rails. Depending on the kind of freight to be accommodated in the freight loading system, guide rails are sometimes not necessary and often represent a source of disruption. When this is the case, guide rails are folded down, or in, as necessary. To be able to implement folding movements of the guide rails of this kind, the supporting parts must be aligned with each other with a specification of tight dimensional tolerances. To ensure a reliable and enduring alignment of the supporting parts within freight loading systems subjected to vibration, the attachment of the supporting parts to the structures having inherent dimensional tolerances takes place by form or material connections. However, these have the disadvantage that adjustment tasks as well as any later fine alignments on the supporting parts are either not possible at all, or are only possible with a large amount of effort.

SUMMARY OF THE INVENTION

The object of the invention is to identify an adjustment device, with which adjustment and alignment tasks on the supporting parts are simplified.

This object is achieved according to the invention with an adjustment device for the alignment of supporting parts pivotally accommodating guide rails of a freight loading system on structures having inherent dimensional tolerances with supporting parts. Advantageous further embodiments of the invention are discussed below.

The adjustment device according to the invention is distinguished in that each supporting part is designed as a bearing insert that can be inserted in a bearing eye of a bearing block such that it cannot rotate. Each bearing insert has fitting surface sections separated from one another by planes of symmetry and also at least one asymmetrically arranged axis accommodation. With the accommodation of the bearing insert in the bearing block such that it cannot rotate, any rotational movements between the fitting surfaces of the bearing insert and the fitting surfaces of the bearing eye caused by vibrations in the freight loading system are advantageously prevented. The number of adjustment positions that can be implemented with the adjustment device according to the invention corresponds to the number of fitting surface sections separated from one another by planes of symmetry. Adjustment and alignment tasks can thus be carried out particularly simply by extraction of the bearing insert from the bearing eye, a rotational adjustment movement into a desired adjustment position, and a reinsertion of the bearing insert into the bearing eye. An asymmetric or eccentric arrangement of the axis accommodation is then already endowed, if the axis accommodation is laterally displaced relative to at least one of the planes of symmetry present in the bearing insert. This displacement dimension is a quantity that is permanently ascribed to the bearing insert in question, which in each individual adjustment position receives another orientation.

According to a first further development of the invention each bearing insert has at least two fitting surface sections arranged in mirror symmetry to one another. The bearing insert can, for example, be designed as a T-bar profile, with which a maximum of two adjustment positions can thereby be created, in that the bearing insert is extracted from the bearing eye, turned, and with its other end advanced respectively, is inserted into the bearing eye.

According to an advantageous further development of the invention, each bearing insert has at least two fitting surface sections arranged axisymmetrically to one another. With just two fitting surface sections, the bearing insert can, for example, have an oval or rectangular bar profile shape, so that two adjustment positions are created, aligned at an angle of 180 degrees to one another.

According to an advantageous further development of the invention, each bearing insert has more than two fitting surface sections arranged axisymmetrically to one another. Thus the bearing insert can, for example, be designed as a polygon, wherein the number of edges advantageously corresponds to the number of adjustment positions that can be implemented with the adjustment device according to the invention.

According to a next further development of the invention each fitting surface section has at least one groove running parallel to the axis. Compared with a bearing insert designed as a polygon, in which all edges are directed outward, the fitting surface sections in this case have both edges that are directed outward and also corners that are directed inward.

In order to be able to implement the accommodation of the bearing insert in a circular bearing eye such that the former cannot rotate, the bearing eye has on its interior surfaces at least one key running parallel to the axis and corresponding with each groove in a form fit. This key is preferably designed as a rib protruding out of the interior surface of the bearing eye. In principle it is, however, also conceivable to provide the bearing eye with a plurality of keys or ribs corresponding to the number of grooves arranged in the bearing insert.

In order to increase the number of possible adjustment positions, a plurality of bearing inserts are assigned to the adjustment device, whose axis accommodations in each case are differently asymmetrically arranged. To this end the individual bearing inserts have different distance dimensions to the planes of symmetry related to their bearing inserts. By a selection of bearing inserts, which have different distance dimensions or eccentricities in conjunction with a sufficiently large number of fitting surface sections, all tolerance dimensions of a structure having inherent dimensional tolerances lying within predetermined limits can advantageously be compensated for in a sufficient manner. Thus, the selection of bearing inserts can also have a bearing insert whose axis accommodation is arranged symmetrically and/or axisymmetrically.

The guide rail has joint plates, which in each case have bearing eyes corresponding with the axis accommodations. Preferably joint plate pairs are formed with each of the joint plates, and the distance between the joint plates forming a joint plate pair corresponds to the width of the bearing block and also to that of the bearing insert accommodated therein. After the supporting parts are aligned relative to the structures having inherent dimensional tolerances, the guide rails are pivotally linked to the bearing blocks by means of axis bolts. For this purpose the axis bolts are each passed firstly through one of the bearing eyes of a joint plate pair, then through the axis accommodation aligned in the bearing block, and into the other bearing eye of the joint plate pair in question, and are secured with known securing elements against any inadvertent outward movement.

The invention also relates to an aircraft that makes use of the adjustment device according to the invention.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
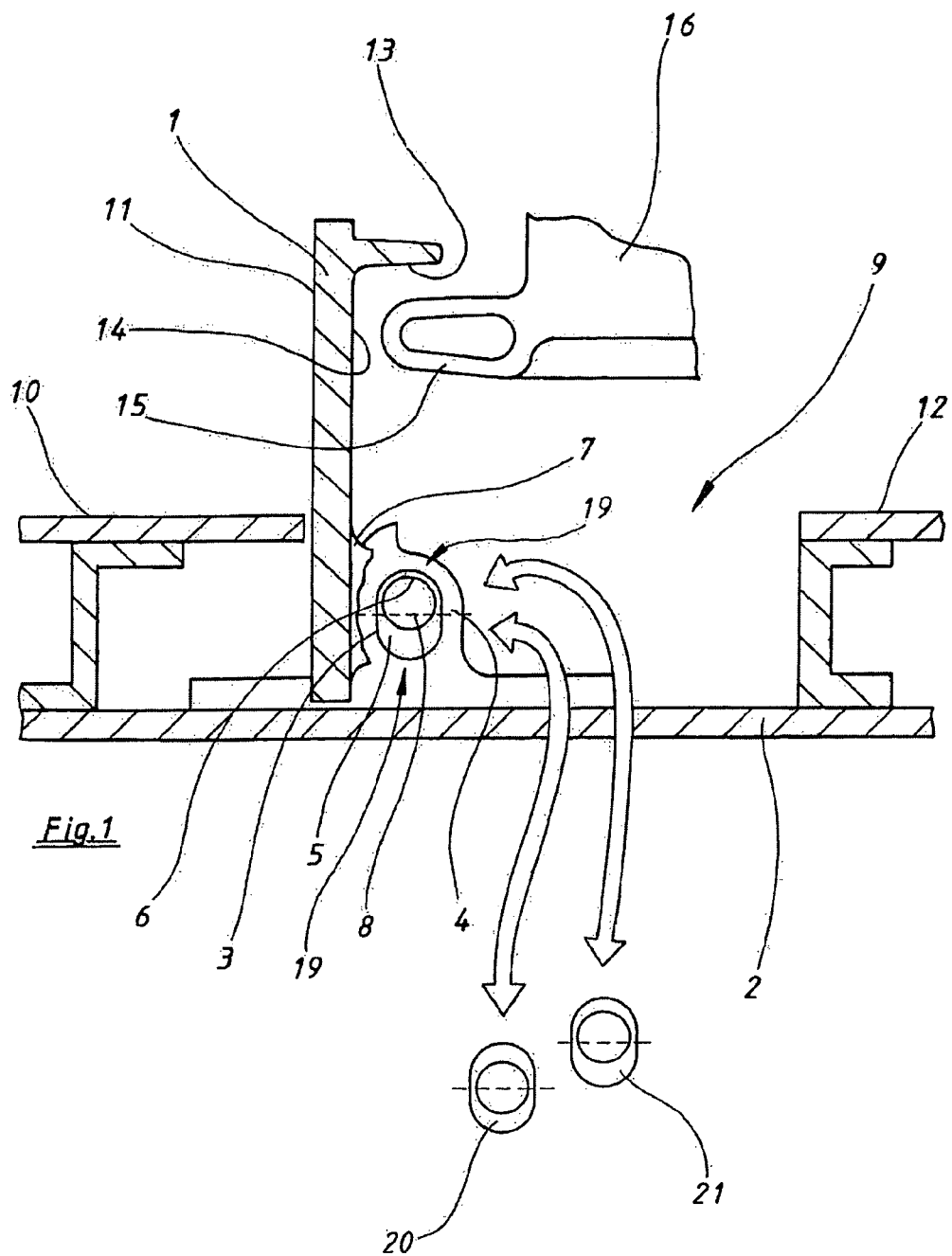
FIG. 1 shows a side view of the adjustment device according to the invention in a first embodiment.

FIG. 1 shows a side view of the adjustment device according to the invention in a first embodiment. The adjustment device serves for the alignment of a supporting part accommodating with a pivotal movement the guide rails 1 of a freight loading system on structures having inherent dimensional tolerances 2. The supporting part is designed as a bearing insert 5 that can be inserted in a bearing eye 3 of a bearing block 4 such that it cannot rotate. Bearing insert 5 has fitting surface sections 19 separated from one another by planes of symmetry as well as at least one asymmetrically arranged axis accommodation 6. Guide rails 1 have joint plates 7, whose bearing eyes 3 are connected via a bearing bolt 8 by means of a pivot joint with bearing block 4 such that guide rail 1 can be snapped into the space 9 and a plane freight loading surface is produced from the surface sections 10, 11, 12. Guide rails 1 have guide surfaces 13, 14 for the guidance and securing of a runner 15 of a container 16.

FIG. 1 also shows bearing inserts 20 and 21 in addition to bearing insert 5 assigned to the adjustment device. As shown in FIG. 1, each bearing insert 5, 20, 21 has axis accommodations that are differently asymmetrically arranged.

Figure 2:
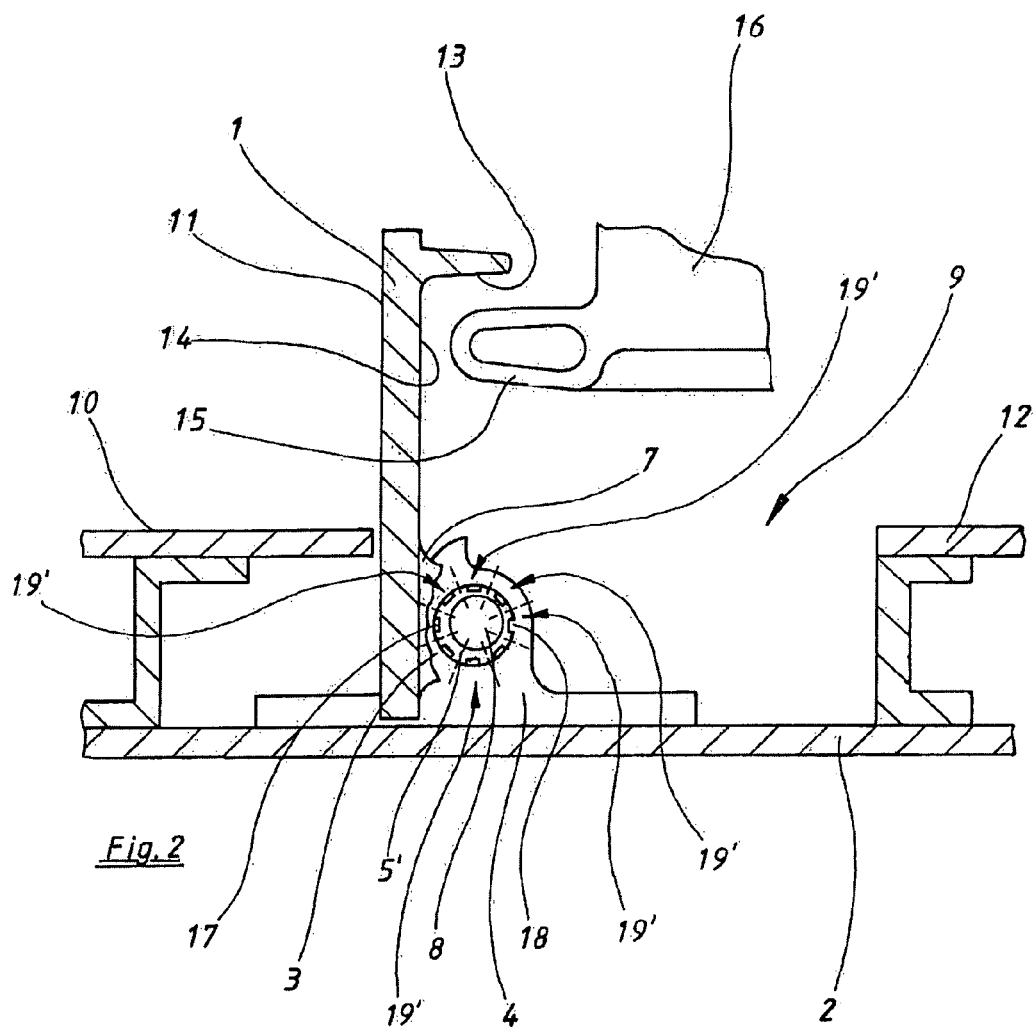
FIG. 2 shows a side view of the adjustment device according to the invention in a second embodiment.

FIG. 2 shows a side view of the adjustment device according to the invention in a second embodiment, in which each of the eight fitting surface sections 19' of bearing insert 5' has a groove 17 running in parallel with the axis. Bearing eye 3 has in contrast just a single key 18 running parallel to the axis and corresponding with each groove 17 in a form fit. Except for bearing insert 5' and fitting surface sections 19', the same elements are provided with the same reference numbers.

Although at least one embodiment of the present invention has been shown and described, it is apparent that many changes and modification may be made thereunto without departing from the spirit and scope of the invention.

What is claimed is:

1. An adjustment device for the alignment of supporting parts pivotally accommodating a guide rail of a freight loading system on a structure having inherent dimensional tolerance, comprising:
   a) a supporting part comprising a bearing insert having a number of fitting surface sections that are separated from one another by planes of symmetry, and having at least one asymmetrically arranged axis accommodation;
   b) a bearing block;
   c) a bearing eye within said bearing block;
   wherein said bearing insert is adapted to be inserted into said bearing eye such that said bearing insert cannot rotate; and
   wherein adjustment and alignment of the supporting parts is carried out by extracting the bearing insert from the bearing eye, rotationally moving the bearing insert into a desired adjustment position of a number of adjustment positions corresponding to the number of the fitting surface sections separated from one another by planes of symmetry, and reinserting the bearing insert into the bearing eye.

2. The adjustment device according to claim 1, wherein at least two of said fitting surface sections are arranged in mirror image symmetry to one another.

3. The adjustment device according to claim 1, wherein at least two of said fitting surfaces sections are arranged axisymmetrically to one another.

4. The adjustment device according to claim 1, wherein said each fitting surface section has at least one groove running parallel to the axis.

5. The adjustment device according to claim 4, wherein said bearing eye has at least one key running parallel to said axis and corresponding with said groove in a form fit.

6. The adjustment device according to claim 1, wherein said bearing insert comprises a plurality of bearing inserts and said plurality of bearing inserts are assigned to said adjustment device, wherein each bearing insert has axis accommodations that are differently asymmetrically arranged.

7. The adjustment device according to claim 1, wherein a guide rail has joint plates, said joint plates comprising said bearing eye corresponding with the axis accommodation.

8. An aircraft comprising an adjustment device for the alignment of supporting parts on structures having inherent dimensional tolerances in an aircraft fuselage, the adjustment device comprising:
   a) a supporting part comprising a bearing insert having a number of fitting surface sections that are separated from one another by planes of symmetry, and having at least one asymmetrically arranged axis accommodation;
   b) a bearing block;
   c) a bearing eye within said bearing block;
   wherein said bearing insert is adapted to be inserted into said bearing eye such that said bearing insert cannot rotate; and wherein adjustment and alignment of the supporting parts is carried out by extracting the bearing insert from the bearing eye, rotationally moving the bearing insert into a desired adjustment position of a number of adjustment positions corresponding to the number of the fitting surface sections separated from one another by planes of symmetry, and reinserting the bearing insert into the bearing eye.

* * * * *